United States Patent [19]

Mitchell

[11] 4,306,639

[45] Dec. 22, 1981

[54] DISC BRAKE CALIPER WITH MOLDED FLEX PISTON

[75] Inventor: Clarence I. Mitchell, Xenia, Ohio

[73] Assignee: General Motors Corporation, Detroit, Mich.

[21] Appl. No.: 159,151

[22] Filed: Jun. 13, 1980

[51] Int. Cl.³ .......................................... B60T 11/10
[52] U.S. Cl. ................................... 188/370; 92/13.2; 92/94; 92/132; 92/171; 188/71.8; 188/361; 188/216; 192/88 R
[58] Field of Search .................... 188/72.3, 72.4, 72.5, 188/71.8, 153 D, 196 P, 361, 362, 363, 364, 365, 368, 369, 370, 216; 92/40, 94, 98, 48, 171, 132, 13.2; 192/88 R, 88 A, 88 B, 111 A

[56] References Cited

U.S. PATENT DOCUMENTS

| 884,694 | 4/1908 | Weant | 92/132 X |
|---|---|---|---|
| 1,800,380 | 4/1931 | Fishback | 188/364 X |
| 2,140,778 | 12/1938 | White | 188/362 |
| 3,277,983 | 10/1966 | Jeffries . | |
| 3,589,481 | 6/1971 | Motsch et al. . | |
| 3,675,743 | 7/1972 | Thompson . | |
| 4,042,072 | 8/1977 | Baba . | |
| 4,077,499 | 3/1978 | Baram . | |

Primary Examiner—George E. A. Halvosa
Attorney, Agent, or Firm—D. D. McGraw

[57] ABSTRACT

A light weight metal caliper housing has cored holes in the cast bore. A nylon bore insert lines the bore side wall. A molded flex piston has hydraulic fittings incorporated as a part of it and the fittings extend through the cored holes. The center portion of the piston is shaped to permit piston flexibility for axial expansion and contraction. The forward end of the piston is closed by a thermal protector, the outer surface of which is engaged by the back of the brake shoe. A low rate extension spring within the piston returns the piston to the fully non-applied position. The spring has one end attached to a plate which resists movement within the free piston but is moved when sufficient brake lining wear occurs so that the extension force applied through the spring during brake apply overcomes the resistance of the movable plate to such movement, causing the movable plate to assume an adjusted position. The arrangement eliminates machining of the bore surfaces and the threading of ports in the casting for bleeder and pressure inlet fittings.

3 Claims, 2 Drawing Figures

DISC BRAKE CALIPER WITH MOLDED FLEX PISTON

The invention relates to a disc brake caliper assembly and more particularly to one in which a cast section is formed so as to receive a flexible piston therein. The flexible piston is capable of axial movements by use of brake actuating pressure and release in a chamber formed within the piston. A brake piston and shoe retraction spring is provided within the piston by means of an extension spring which is adjusted in accordance with brake lining wear so that it always provides sufficient clearance to at least substantially eliminate brake shoe drag during brake release. The casting in which the piston is contained does not require machining, but uses a hard plastic cylinder insert therein to form a relatively smooth piston cylinder wall within which the piston is mounted. The piston is provided with suitable hydraulic fittings for bleeding and for the introduction and release of brake actuating pressure within the piston.

IN THE DRAWING

Figure 1:
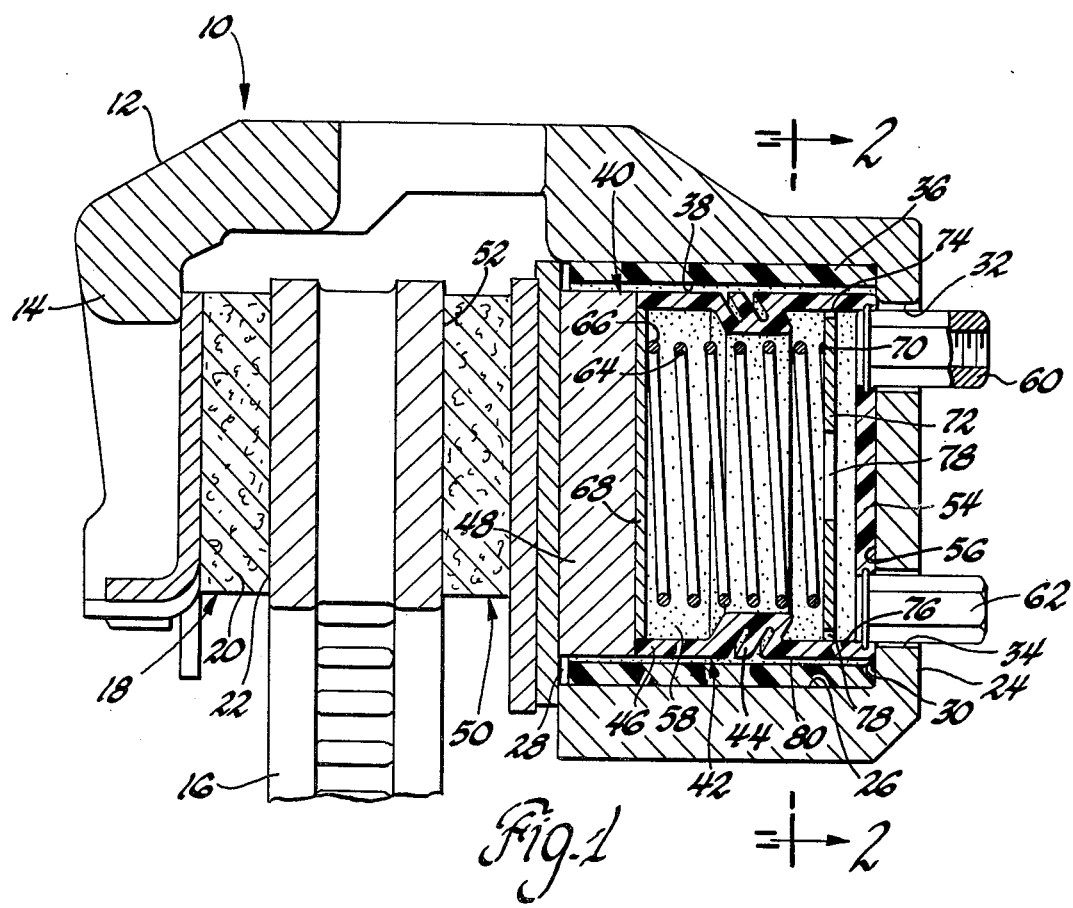
FIG. 1 is a cross section view of a caliper assembly embodying the invention.
Figure 2:
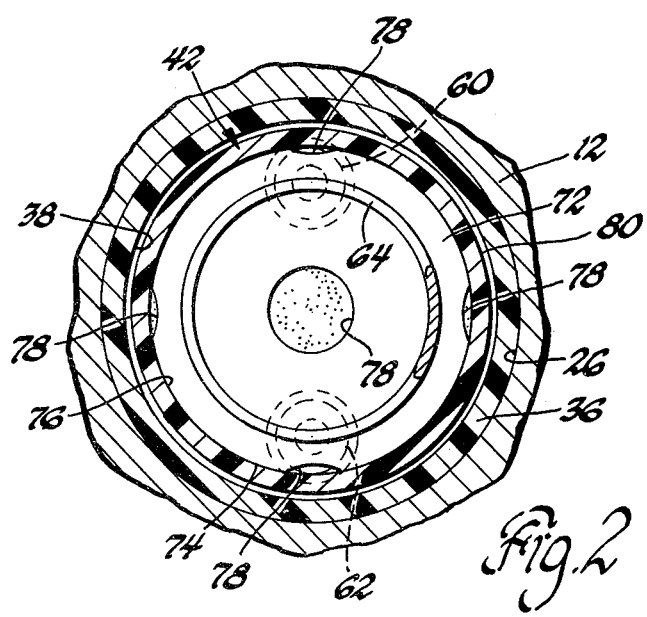
FIG. 2 is a fragmentary cross section view showing a portion of the assembly of FIG. 1, with parts broken away, the view being taken in the direction of arrows 2—2 of FIG. 1.

The disc brake caliper assembly 10 is illustrated as being of the single piston sliding caliper type operating in much the same manner as the assembly shown in U.S. Pat. Nos. 3,628,639 entitled "Disc Brake Caliper Mounting Means", issued Dec. 21, 1971; 3,917,032 entitled "Single Mount and Guide Pin for a Caliper of a Disc Brake Assembly", issued Nov. 4, 1975; and 3,997,034 entitled "Disc Brake Sliding Caliper Mounting", issued Dec. 14, 1976. The invention may also be embodied in opposed piston calipers, multiple piston calipers and fixed caliper-sliding disc arrangements.

The caliper assembly 10 is illustrated as including a frame 12 having one leg 14 extending along one side of a disc 16 to be braked. A brake shoe and lining assembly 18 is mounted on leg 14 so that the friction material 20 of assembly 18 is engageable with the braking surface 22 on one side of disc 16. Frame 12 has another leg 24 extending along the other side of disc 16. At least this leg portion of frame 12 is cast, and the entire frame may be cast, as is illustrated in the drawing. Leg 24 has a recess 26 formed therein with the recess opening 28 positioned toward leg 14 and the recess base 30 positioned away from leg 14. Openings 32 and 34 are formed through the recess base 30. The recess 26 and the openings 32 and 34 are preferably molded as the frame leg 24 is cast. It is one of the features of the invention that the recess and openings do not require additional finishing beyond that of the cast surface. It is recognized, however, that there may be other reasons making it more desirable to provide some or all of the openings 32 and 34 and the recess 26 by some other operation. Even so, the invention does not require finishing the surfaces defining the recess and these openings to the extent that is normally required in brake calipers like those shown in the above mentioned patents.

A hard plastic cylinder 36, made of a suitable material such as nylon, is inserted within recess 26 so as to define a bore insert with the internal surface 38 thereof defining a piston cylinder wall. A piston assembly 40 is received in the cylinder 36. The piston assembly includes a generally cup-shaped molded plastic piston 42 having a side wall 44 which is linearly flexible for axial expansion and contraction. As illustrated in the drawing, a portion of side wall 44 is so molded as to provide for such linear flexibility. Piston 42 has an open end 46 and a piston head 48 which closes and seals open end 46. Piston head 48 is preferably made of a suitable material so that it also acts as a thermal protector, effectively preventing heat generated by friction braking from reaching the hydraulic brake fluid used to actuate the brakes, at least to such an extent that there is no adverse effect on the hydraulic brake fluid. Piston head 48 engages the back of another brake shoe and lining assembly 50, which is so mounted relative to caliper leg 24 and piston assembly 40 that the lining assembly is engageable in friction braking relation with the other friction surface 52 on the other side of disc 16 from surface 22.

Piston 42 has a closed end 54 which engages the inner surface 56 of recess base 30. The piston assembly 40 therefore defines a closed piston inner chamber 58. A pair of hydraulic fittings 60 and 62 are provided as a part of piston 42 and respectively extend through openings 32 and 34 so that suitable hydraulic connections may be made thereto. Two hydraulic fittings and openings are illustrated, one being provided for bleeding purposes and the other being provided for connection to a source of brake fluid actuating pressure such as a master cylinder. When fitting 60 is the one being used for bleeding, it and the opening 32 through which it extends should, of course, be oriented in accordance with the mounted position of the caliper on a vehicle so that the fitting connects with the top portion of piston inner chamber 58.

A low rate extension spring 64 is positioned within piston inner chamber 58. One spring end 66 is secured to a fixed spring plate 68 illustrated as being fixed to the piston head 48 and the end 46 of piston 42. This is preferably done as part of the molding or other assembly operation in which piston open end 46 is so secured to piston head 48 that brake actuating pressures likely to be encountered within chamber 58 will not leak at the line of attachment. The other end 70 of spring 64 is attached to a movable spring plate 72 which has its outer periphery 74 engaging the inner surface 76 of a part of piston 42 so that the plate normally resists axial movement relative to the piston. However, upon sufficient force being applied through spring 64 as the spring extends during pressurization of chamber 58, the amount of such extension being responsible to the amount of brake lining wear, plate 72 moves slightly toward disc 16 in an axial direction and in relation to inner surface 76 of piston 42. This movement adjusts the amount of retraction obtained upon release of brake actuating pressure in chamber 58 as extension spring 64 recovers to its shorter original length. The recovery action of spring 64 acts on spring plate 68 and piston head 48 to pull them axially in a direction away from disc 16 so that the brake shoe and lining assembly 50 clears the disc, and frame 12 as well as leg 14 moves to also provide clearance between disc 16 and brake shoe and lining assembly 18. It is preferable to have an essentially drag-free brake assembly, and this is accomplished by adjustment so that the brake shoes are in the immediate vicinity of disc 16 during brake release, and engage the disc in braking relation with a relatively small increase in displacement within chamber 58 as the brake is actuated. It is noted that plate 72 is provided with one or more openings 78 so as to permit the free interflow of brake fluid within chamber 58.

It is preferable to have some slight radial spacing between the outer surface 80 of piston 42 and the inner surface 38 of cylinder 36 so that there is no friction which must be overcome to either actuate or retract the piston.

It can be seen that the caliper assembly 10 can be cast and used without requiring any machining, and that the cylinder 36 and piston assembly 40 may be readily manufactured so that they also require no additional machining. The assembly therefore lends itself to economical manufacture as well as being light weight and drag-free.

The embodiments of the invention in which an exclusive property or privilege is claimed are defined as follows:

1. In a disc brake caliper assembly formed with a caliper frame having a pair of spaced legs adapted to extend along either side of a disc to be braked, and brake shoe and lining assemblies operatively mounted between said legs for engaging the disc to be braked in braking relation, the improvement comprising:

at least one of said legs being cast and having a recess formed therein and opening toward the other of said legs with the base of said recess positioned away from the other of said legs, spaced openings formed through the base of said recess and opening outwardly away from the other of said legs, said recess and said openings being molded as said one frame leg is cast;

a hard plastic cylinder made of a suitable material such as nylon, said cylinder being inserted within said recess and defining a bore insert with the internal surface thereof defining a piston cylinder wall;

and a piston assembly received in said cylinder in normally radially spaced relation to said piston cylinder wall, said piston assembly including a generally cup-shaped molded plastic piston having a side wall which is linearly flexible for axial expansion and contraction, an open end, a closed end engaging said recess base and having hydraulic fittings extending therefrom through said spaced openings for connection with a brake fluid and for bleeding so that the inner chamber formed by said piston assembly is subject to brake actuating pressures, a piston head closing said open end and defining a thermal protector and engaging one of said brake shoe and lining assemblies to move the same when hydraulic pressure is applied in said piston, and means including a low rate extension spring in said piston acting to retract said piston head upon brake actuating pressure release to limit drag of brake lining on the disc.

2. In a disc brake caliper assembly formed with a caliper frame having a pair of spaced legs adapted to extend along either side of a disc to be braked, and brake shoe and lining assemblies operatively mounted between said legs for engaging the disc to be braked in braking relation, the improvement comprising:

a piston housing associated with one of said legs, said piston housing being cast and having a recess formed therein and opening toward the other of said legs with the base of said recess positioned away from the other of said legs, spaced openings formed through the base of said recess and opening outwardly away from the other of said legs, said recess and said openings being molded as said piston housing is cast;

a cylinder liner inserted within said recess and defining a bore insert with the internal surface thereof defining a piston cylinder wall;

and a piston assembly received in said cylinder liner in normally radially spaced relation to said piston cylinder wall, said piston assembly including a generally cup-shaped molded plastic piston having a side wall which is radially inflexible but linearly flexible for axial expansion and contraction and is so spaced radially inwardly of said piston cylinder wall that there is no sliding surface contact therebetween during brake actuation and release, an open end, a closed end engaging said recess base and having hydraulic fittings extending therefrom through said spaced openings for connection with a selectively pressurizable brake fluid and for bleeding so that the inner chamber formed by said piston assembly is subject to brake actuating pressures, a piston head closing said open end and defining a thermal protector and engaging one of said brake shoe and lining assemblies to move the same when hydraulic pressure is applied in said piston, and means including a low rate extension spring in said piston acting to retract said piston head upon brake actuating pressure release to substantially eliminate drag of brake lining on the disc while the brake caliper assembly is released.

3. A wheel brake actuating piston assembly comprising:

a cast piston housing having a recess formed therein and opening axially and having a base, spaced openings formed through said recess base, said recess and said openings being molded as said piston housing is cast;

a hard plastic cylinder made of a suitable material such as nylon, said cylinder being inserted within said recess and defining a bore insert with the internal surface thereof defining a piston cylinder wall;

and a piston assembly received in said cylinder in normally radially spaced relation to said piston cylinder wall, said piston assembly including a generally cup-shaped molded plastic piston having a side wall which is linearly flexible for axial expansion and contraction, an open end, a closed end engaging said recess base and having hydraulic fittings extending therefrom through said spaced openings for connection with a selectively pressurizable brake fluid and for bleeding so that the inner chamber formed by said piston assembly is subject to brake actuating pressures, a piston head closing said open end and being movable in a brake actuating direction when hydraulic pressure is applied in said piston and linearly expands said piston, and means including a low rate extension spring in said piston acting to retract said piston head upon brake actuating pressure release.

* * * * *